United States Patent
Tabata et al.

[11] Patent Number: 5,947,856
[45] Date of Patent: Sep. 7, 1999

[54] CONTROL SYSTEM FOR AUTOMATIC TRANSMISSION, INCLUDING COORDINATED FRICTIONAL ENGAGEMENT ELEMENT RELEASE CONTROL

[75] Inventors: Atsushi Tabata, Okazaki; Hideki Miyata, Toyota; Yasuo Hojo, Nagoya; Masahiko Ando, Okazaki; Fumitomo Yokoyama; Kazuhisa Ozaki, both of Aichi-ken; Akira Fukatsu, Anjo; Motoyuki Sakai, Aichi-ken; Makoto Hijikata, Toyota, all of Japan

[73] Assignees: Toyota Jidosha Kabushiki Kaisha, Toyota; Aisin AW Kabushiki Kaisha, Anjo, both of Japan

[21] Appl. No.: 08/888,109

[22] Filed: Jul. 3, 1997

[30] Foreign Application Priority Data

Jul. 3, 1996 [JP] Japan .................................. 8-192953
Jun. 6, 1997 [JP] Japan .................................. 9-165165

[51] Int. Cl.$^6$ .................................................. F16H 61/06
[52] U.S. Cl. .......................... 475/128; 475/117; 477/98; 477/131; 477/155
[58] Field of Search ...................... 475/117, 128, 475/131; 477/98, 116, 117, 131, 155, 162, 163

[56] References Cited

U.S. PATENT DOCUMENTS

| | | | |
|---|---|---|---|
| 2,794,349 | 6/1957 | Smirl | 475/117 X |
| 3,724,294 | 4/1973 | Gaus | 477/98 |
| 4,941,370 | 7/1990 | Ishii | 475/128 |
| 5,076,117 | 12/1991 | Shibayama | 477/98 |
| 5,433,124 | 7/1995 | Person | 477/131 X |
| 5,505,672 | 4/1996 | Sakai et al. | 477/117 |
| 5,792,023 | 8/1998 | Bazzi et al. | 477/116 |

FOREIGN PATENT DOCUMENTS

| | | |
|---|---|---|
| 3-8422 | 2/1991 | Japan . |
| 4-312266 | 11/1992 | Japan . |
| 5-54575 | 8/1993 | Japan . |

*Primary Examiner*—Rodney H. Bonck
*Assistant Examiner*—Sherry Lynn Estremsky
*Attorney, Agent, or Firm*—Oblon, Spivak, McClelland, Maier & Neustadt, P.C.

[57] ABSTRACT

A control system for an automatic transmission, in which a first frictional engagement element and a second frictional engagement element are released according to a shift from a running range to a non-running range. The shift from the running range to the non-running range is detected, and the reduction in the oil pressure of the second frictional engagement element is controlled on the basis of the reduction in the oil pressure of the first frictional engagement element when the shift from the running range to the non-running range is detected.

17 Claims, 8 Drawing Sheets

FIG.4

|      | $C_0$ | $C_1$ | $C_2$ | $B_0$ | $B_1$ | $B_2$ | $B_3$ | $B_4$ | $F_0$ | $F_1$ | $F_2$ |
|------|-------|-------|-------|-------|-------|-------|-------|-------|-------|-------|-------|
| N,P  | ○ |   |   |   |   |   |   |   |   |   |   |
| Rev. |   |   | ○ | ○ |   |   |   | ○ |   |   |   |
| 1st  | ○ | ○ |   |   |   |   |   | ● | ○ |   | ○ |
| 2nd  | ● | ○ |   |   |   |   | ○ |   | ○ |   |   |
| 3rd  | ○ | ○ |   |   | ● | ○ |   |   | ○ | ○ |   |
| 4th  | ○ | ○ | ○ |   |   | △ |   |   | ○ |   |   |
| 5th  |   | ○ | ○ | ○ |   | △ |   |   |   |   |   |

CONTROL SYSTEM FOR AUTOMATIC TRANSMISSION, INCLUDING COORDINATED FRICTIONAL ENGAGEMENT ELEMENT RELEASE CONTROL

BACKGROUND OF THE INVENTION

1. Field of the Invention

The present invention relates to a control system for an automatic transmission of a vehicle and, more particularly, to a control system for performing a control to prevent the shocks which might otherwise accompany the change in ranges.

2. Related Art

In the automatic transmission for a vehicle, a neutral state or a park stage, in which no power is transmitted, is established by switching the ranges, as based upon the manual operation of the driver. In this case, the torque transmission states in a gear speed change mechanism constructing the automatic transmission are switched to cause shocks due to the slips of the frictional engagement elements and the change in the output torque.

In a control system for an automatic transmission disclosed in JPA-4-312266, for example, the reverse stage is inhibited according to the situation of the vehicle when the neutral range is shifted to the reverse range for the reverse running. Specifically, the automatic transmission, as disclosed in this publication is constructed such that an auxiliary transmission unit capable of switching high and low stages is connected to the input side of a main transmission unit for setting the reverse stage and a plurality of forward stages, and such that the auxiliary transmission unit is set to the high stage when the reverse stage is to be set. The reason why the auxiliary transmission unit is set to the high stage for the reverse stage is that the gear ratio of the reverse stage to be set in the main transmission unit is so high that the total gear ratio may be given a practically proper value by setting the auxiliary transmission unit to the high stage.

In the case of the shift from the neutral state to the reverse range, moreover, a control is usually made to reduce the engine torque so as to reduce the torque to be applied to the frictional engagement elements during the speed change. When this input torque reducing control cannot be executed, however, the frictional engagement elements to be applied for setting the reverse stage may be deteriorated in their durabilities by their slips, and they are protected by inhibiting the reverse stage.

When the shift is made from the state, where the vehicle is stopped at the reverse gear stage, to the neutral range or the parking range so as to continue the stopped state, shift shocks occur if the torque to be applied to the output shaft is abruptly reduced. Especially the frictional engagement elements to be applied for setting the reverse stage include those to be applied for establishing a predetermined forward stage or for making the engine braking effective, and their apply/release characteristics are set to those for a frequently used gear stage. In the prior art, therefore, there is not made the release control which is suited for the shift from the reverse stage to the neutral state. Nor is provided this means in the invention disclosed in the aforementioned publication. In the prior art, therefore, at a shift from a running range to a non-running range, i.e., at the shift from the reverse range to the neutral range or the parking range, the shocks may possibly be physically felt by the change in the output torque when the frictional engagement elements are abruptly released.

In the prior art, as described above, the oil pressure is equally controlled at all times at a manual shift from the running range such as the reverse range to the non-running range such as the neutral range. As a result, the draining rate of the oil pressure changes when the oil viscosity changes. When the oil viscosity rises, for example, the drainage of the oil pressure from the frictional engagement element to be released is delayed. This delay in the drainage may deteriorate the shocks.

SUMMARY OF THE INVENTION

An object of the present invention is to provide a control system for an automatic transmission, which can make a control to reduce the shocks at a shifting time to a non-running range and can facilitate the control.

According to the control system of the present invention, therefore, when a first frictional engagement element and a second frictional engagement element are to be released to shift a running range to the non-running range, the reduction in the oil pressure of the second frictional engagement element is controlled on the basis of the reduction state of the oil pressure of the first frictional engagement element.

At the shift to the non-running range, therefore, it is possible to prevent one of the frictional engagement elements from being abruptly released and the output torque from being abruptly changed by the abrupt release. This makes it possible to prevent the shocks, as might otherwise follow the shift to the non-running range, effectively.

In the present invention, moreover, the timings for switching the first frictional engagement element and the second frictional engagement element are controlled by the existing shift valve. Alternatively, the releasing timings for the individual frictional engagement elements are controlled by controlling the solenoid valve for feeding the signal pressure to the shift valve.

According to the present invention, therefore, by the shift valve usually provided in the automatic transmission, the control of the oil pressure of the second frictional engagement element, as accompanying the shift to the non-running range, can be executed so that the shocks, as might otherwise be caused at the shift to the non-running range, can be easily eliminated by the system having the simple construction.

In the present invention, moreover, the pressure discharging line is selected depending upon the oil temperature when the pressure is to be discharged from a predetermined frictional engagement element by making a switching the range to the non-running range. Specifically, a pressure discharging line of low resistance is selected to relieve the frictional engagement element when the viscosity is high because of a low oil temperature.

This makes it possible to prevent the delay, as might otherwise be caused by the shift to the non-running range, in the release of the frictional engagement element and the shocks accompanying the delay.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 4 is a diagram showing the applied/released states of frictional engagement elements for setting individual gear stages;

DESCRIPTION OF THE PREFERRED EMBODIMENT

Figure 2:
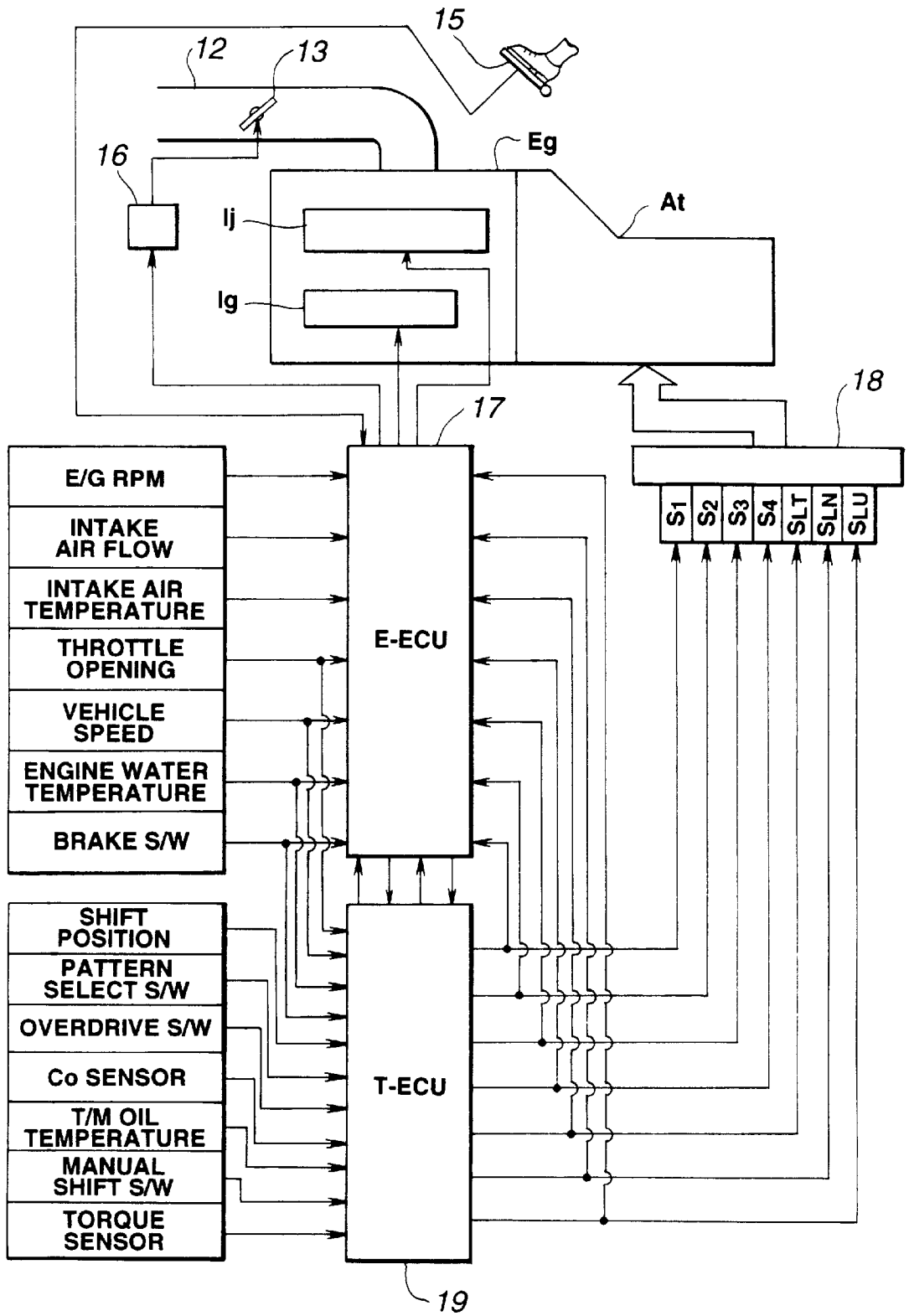
FIG. 2 is a schematic block diagram for explaining the present invention.

The present invention will be described more specifically with reference to the accompanying drawings. FIG. 2 is an overall control system chart showing one embodiment of the present invention. An engine Eg, as connected to an automatic transmission At, is constructed to control its output electrically, and is equipped in its intake conduit 12 with an electronic throttle valve 13 to be driven by a servo motor 16. On the other hand, an accelerator opening, i.e., the stroke of depression of an accelerator pedal 15 for controlling the output of the engine Eg is detected by the not-shown sensor so that the detection signal is inputted to an engine electronic control unit (E-ECU) 17. This electronic control unit 17 is composed mainly of a central processing unit (CPU), a memory unit (RAM, ROM) and an input/output interface. To the electronic control unit 17, there are inputted as control data a variety of signals including the engine (E/G) RPM, the intake air flow, the intake air temperature, the throttle opening, the vehicle speed, the engine water temperature and the signal coming from a brake switch. On the basis of those data, the electronic control unit 17 controls the degree of opening of the electronic throttle valve 13, the fuel injection rate by an injector Ij and the ignition timing by an igniter Ig.

The automatic transmission At is controlled in the speed changes, the lockup clutch, the line pressure and the apply pressure of a predetermined frictional engagement element by an oil pressure control unit 18. This oil pressure control unit 18 is electrically controlled and is equipped with: first to third shift solenoid valves S1 to S3; a fourth solenoid valve S4 for controlling the engine braking state; a linear solenoid valve SLT for controlling the line pressure; a linear solenoid valve SLN for controlling an accumulator back pressure; and a linear solenoid valve SLU for controlling the apply pressures of a lockup clutch and a predetermined frictional engagement element.

There is also provided an automatic transmission electronic control unit (T-ECU) 19 for controlling the speed changes, the line pressure and the accumulator back pressure by outputting signals to those solenoid valves. This automatic transmission electronic control unit 19 is composed mainly of a central processing unit (CPU), a memory unit (RAM, ROM) and an input/output interface. To the electronic control unit 19, there are inputted as control data the throttle opening, the vehicle speed, the engine water temperature, the signal from the brake switch, a shift position, a signal from a pattern select switch, a signal from an overdrive switch, a signal from a C0 sensor for detecting the RPM of a later-described clutch C0, the oil temperature of the automatic transmission, a signal from a manual shift switch, and a signal from a torque sensor for detecting the output torque.

Moreover, these automatic transmission electronic control unit 19 and the engine electronic control unit 17 are connected to communicate each other to transfer data such that the signal of the intake air flow per revolution is transmitted from the engine electronic control unit 17 to the automatic transmission electronic control unit 19 and such that a signal equivalent to an instruction signal to each solenoid valve and a signal instructing the gear stage are transmitted from the automatic transmission electronic control unit 19 to the engine electronic control unit 17.

On the basis of the inputted data and the prestored map, more specifically, the automatic transmission electronic control unit 19 is constructed to decide the gear stage, the ON/OFF of the lockup clutch, and the regulated level of the line pressure or the apply pressure, to output an instruction signal to a predetermined solenoid valve on the basis of the decision result, to decide failure, and to make a control thereon. On the basis of the inputted data, on the other hand, the engine electronic control unit 17 not only controls the fuel injection rate, the ignition timing and the opening of the electronic throttle valve 13 but also lowers the output torque temporarily by reducing the fuel injection rate at a speed changing time at the automatic transmission At, by changing the ignition timing or by throttling the opening of the electronic throttle valve 13.

Figure 3:
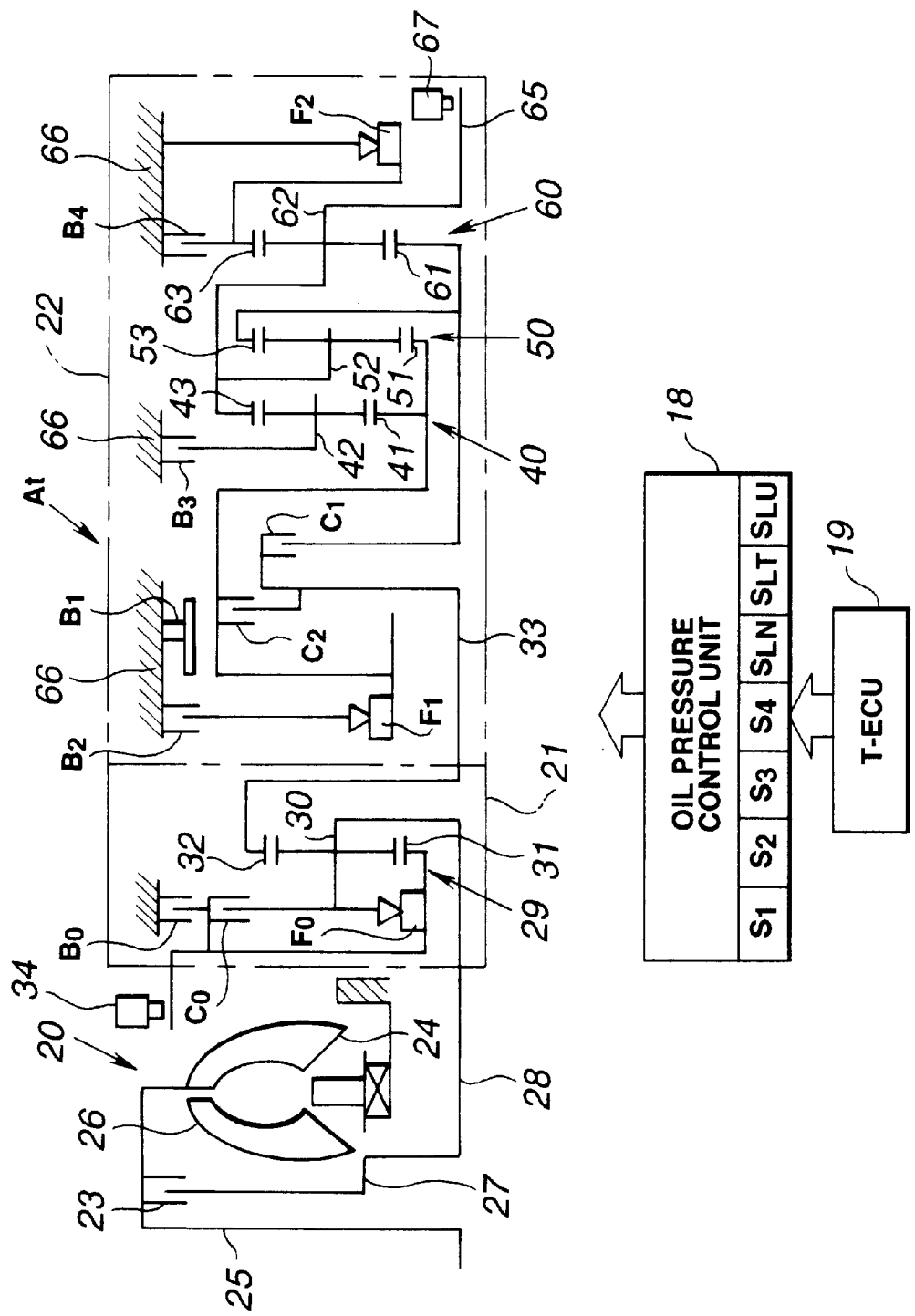
FIG. 3 is a skeleton diagram mainly showing a gear speed change mechanism of an automatic transmission to which is applied the present invention.

FIG. 3 is a diagram showing one example of the gear train of the aforementioned automatic transmission At. The shown construction sets five forward and one reverse gear stages. Specifically, the automatic transmission At, as shown, is constructed to include a torque converter 20, an auxiliary transmission unit 21 and a main transmission unit 22. The torque converter 20 is equipped with a lockup clutch 23, which is interposed between a front cover 25 integrated with a pump impeller 24 and a hub 27 having an integrated turbine runner 26. Moreover, the crankshaft of the engine (although both are not shown) is connected to the front cover 25, and an input shaft 28 having the turbine runner 26 connected thereto is further connected to the carrier 30 of an overdrive planetary gear mechanism 29, as constructing the auxiliary transmission unit 21.

Between the carrier 30 and a sun gear 31 of this planetary gear mechanism 29, there are interposed the multi-disc clutch C0 and a one-way clutch F0. Here, this one-way clutch F0 is applied when the sun gear 31 rotates forward (i.e., in the rotating direction of the input shaft 28) with respect to the carrier 30. A multi-disc clutch B0 is also provided for stopping the rotation of the sun gear 31 selectively. Moreover, a ring gear 32 or the output element of this auxiliary transmission unit 21 is connected to an intermediate shaft 33 acting as the input element of the main transmission unit 22. An NC0 sensor 34 is further provided for detecting the RPM of that multi-disc clutch C0.

In the auxiliary transmission unit 21, therefore, with the multi-disc clutch C0 or the one-way clutch F0 being applied, the planetary gear mechanism 29 rotates as a whole so that the intermediate shaft 33 rotates at the same speed as that of the input shaft 28 thereby to establish a low speed stage. With the brake B0 being applied but with the sun gear 31 being irrotational, on the other hand, the ring gear 32 is accelerated with respect to the input shaft 28 thereby to establish a low speed stage.

On the other hand, the main transmission unit 22 is equipped with three sets of planetary gear mechanisms 40, 50 and 60, the rotary elements of which are connected in the following manner. Specifically, the sun gear 41 of the first planetary gear mechanism 40 and the sun gear 51 of the second planetary gear mechanism 50 are connected together. The ring gear 43 of the first planetary gear mechanism 40, the carrier 50 of the second planetary gear mechanism 52 and the carrier 62 of the third planetary gear mechanism 60 are connected together. An output shaft 65 is connected to that carrier 62. The ring gear 53 of the second planetary gear mechanism 50 is connected to the sun gear 61 of the third planetary gear mechanism 60. To the output shaft 65, there is attached a torque sensor 67 for detecting the output torque.

The gear train of this main transmission unit 22 can set gear stages of a reverse stage and four forward stages and is equipped therefor with the following clutches and brakes. Of these, the clutches will be described at first. A first clutch C1 is interposed between the ring gear 53 of the second planetary gear mechanism 50 and the sun gear 61 of the third planetary gear mechanism 60, as connected to each other, and the intermediate shaft 33. A second clutch C2 is interposed between the sun gear 41 of the first planetary gear mechanism 40 and the sun gear 51 of the second planetary gear mechanism 50, as connected to each other, and the intermediate shaft 33.

Here will be described the brakes. A first brake B1 is a band brake and is arranged to stop the rotations of the sun gears 41 and 51 of the first and second planetary gear mechanisms 40 and 50. Between these sun gears 41 and 51 (i.e, the common sun gear shaft) and a casing 66, on the other hand, there are arrayed in tandem a first one-way clutch F1 and a second brake B2 of a multi-disc brake. Of these, the first one-way clutch F1 is applied when the sun gears 41 and 51 are to be reversed (i.e., backward of the rotating direction of the input shaft 28). A third brake B3 of a multi-disc brake is interposed between the carrier 42 of the first planetary gear mechanism 40 and the casing 66. Between the ring gear 63 of the third planetary gear mechanism 60 and the casing 66, moreover, there are arranged in parallel a fourth brake B4 of a multi-disc brake acting to stop the rotation of the ring gear 63 and a second one-way clutch F2. Incidentally, this second one-way clutch F2 is applied when the ring gear 63 is to rotate backward.

The automatic transmission At described above is enabled to set five forward and one reverse gear stages by applying/ releasing the individual clutches and brakes, as tabulated in the application chart of FIG. 4.

In FIG. 4: symbols ○ indicate the applied states; symbols ● indicate the applied states to be taken at an engine braking time; symbols Δ indicate the applied or released states; and blanks indicate the released states.

Figure 5:
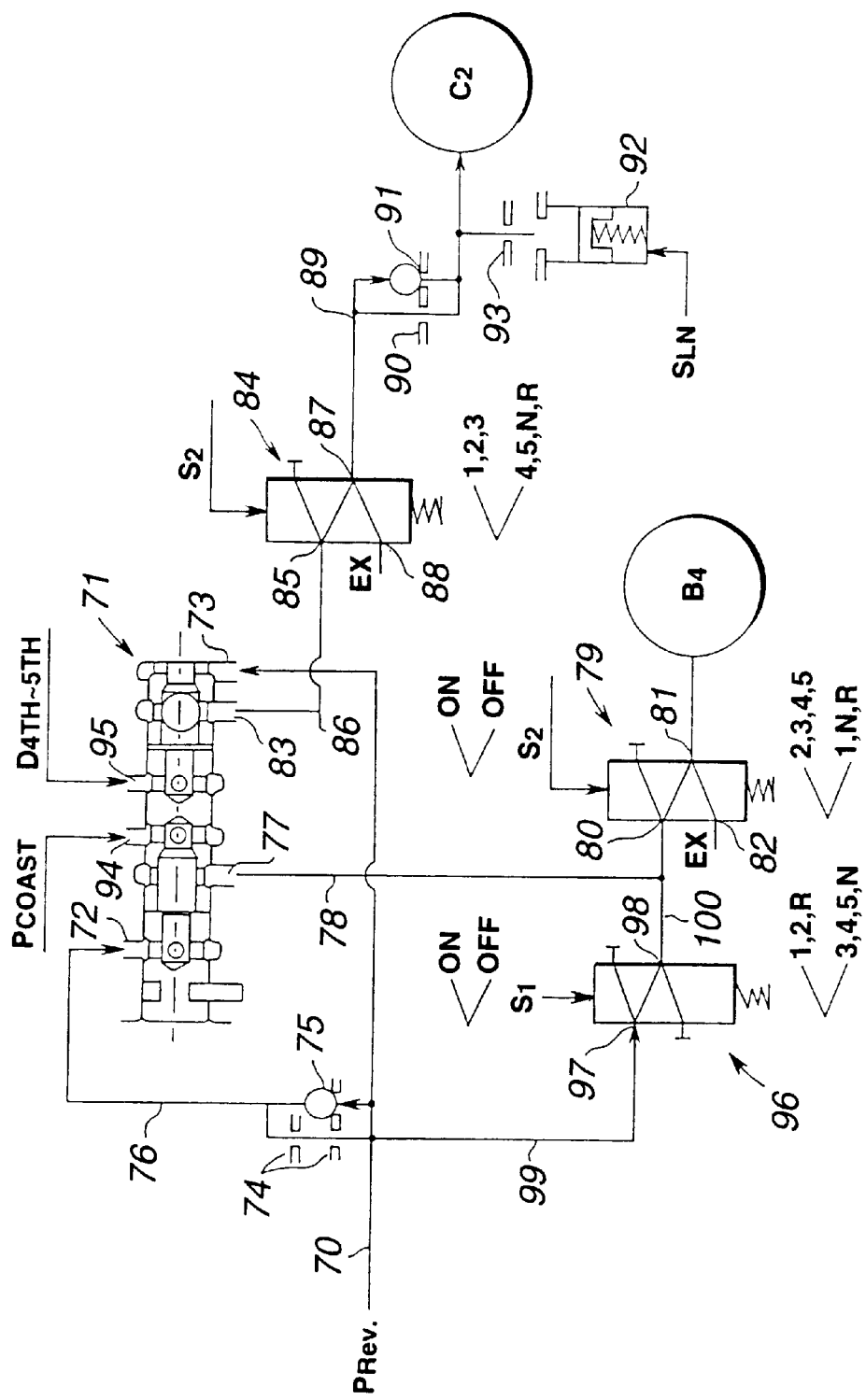
FIG. 5 is a diagram of a portion of a hydraulic circuit for controlling the applications/releases of a second clutch and a fourth clutch to be released in a neutral range.

As described above, the reverse stage is set by setting the main transmission unit 22 in the reverse state and the auxiliary transmission unit 21 to a high speed stage. In this setting, the second clutch C2 and the fourth brake B4 are applied in the main transmission unit 22, as seen from the application chart of FIG. 4, and the hydraulic circuit therefor is constructed, as shown in FIG. 5.

The aforementioned automatic transmission At, to which is applied the present invention, is constructed to set the reverse stage by operating the shift lever to switch the manual valve (although both are not shown), as in the ordinary automatic transmission known in the art. When the reverse stage is selected, an oil passage 70 for an R-range pressure PRev to be outputted from the manual valve is connected with a first input port 72 and a second input port 73 of a check valve 71.

This check valve 71 is a valve for varying the output automatically according to the feed state of the oil pressure and is provided at its one end portion with the first input port 72, with which is connected the oil passage 70 through an orifice 74 and an orifice 75 with a check ball and in parallel with the former orifice 74 and via an oil passage 76. A first output port 77 for outputting the oil pressure when fed to the first input port 72 is formed at an intermediate portion of the check valve 71 and is connected with an input port 80 of a 1-2shift valve 79 via an oil passage 78.

This 1-2shift valve 79 is a valve to be switched by the second shift solenoid valve S2 such that its input port 80 communicates with an output port 81 when the second shift solenoid valve S2 is turned OFF to output the signal pressure, and such that its output port 81 communicates with a drain port 82 when the second shift solenoid valve S2 is turned ON to output no signal pressure. The communicating states of the individual ports in this 1-2shift valve 79 are indicated by symbols at the lower side of FIG. 5. The input port 80 communicates with the output port 81 at the first speed, in an N-range and in the R-range, and the output port 81 communicates with the drain port 82 at second to fifth speeds. Moreover, the fourth brake B4 is connected with that output port 81.

In the check valve 71 adjacent to the second input port 73, on the other hand, there is formed a second output port 83. This second output port 83 is a port for outputting the oil pressure when fed to the second input port 73 and is connected with an input port 85 in a 3-4 shift valve 84 via an oil passage 86. This 3-4 shift valve 84 is a valve to be switched mainly by the second shift solenoid valve S2, and its active states at the individual gear stages are indicated by symbols below itself. Specifically, the input port 85 communicates with an output port 87 at the fourth and fifth speeds and in the N-range and the R-range, and the output port 87 communicates with a drain port 88 at the first to third speeds.

With the output port 87 of this 3-4 shift valve 84, there is connected the second clutch C2 via an oil passage 89. This oil passage 89 is provided with an orifice 90 and an orifice 91 with a check ball and in parallel with the former. With the oil passage 89 closer to the second clutch C2 than those orifices 90 and 91, there is connected a branched accumulator 92 through an orifice 93. This accumulator 92 is fed at its back pressure chamber with the signal pressure PSLN of the linear solenoid valve SLN.

In the aforementioned check valve 71, there is formed adjacent to the first output port 77 a third input port 94 for feeding a coast brake pressure PCOAST to be outputted in a low range for applying the fourth brake B4. Adjacent to the second output port 83, there is further formed a fourth input port 95 to be fed with a D-range pressure at the fourth and fifth speeds.

Between the aforementioned oil passage 70 for the R-range pressure PRev and the input port 80 in the 1-2shift valve 79, moreover, there is interposed a 2-3 shift valve 96. This 2-3 shift valve 96 is a valve to be switched by the first shift solenoid valve S1, and its active states are indicated by symbols at the lower side of FIG. 5. At third to fifth speeds and in the N-range, that is, when the first shift solenoid valve S1 is turned OFF to output the signal pressure, an input port 97 communicates with an output port 98. At the first and second speeds and in the R-range, that is, when the first shift solenoid valve S1 is turned ON to output no signal pressure, the input port 97 and the output port 98 are closed. The input port 97 is connected with an oil passage 99 which is branched from the oil passage 70 for the R-range pressure PRev, and the output port 98 is connected with the input port 80 of the 1-2shift valve 79 via an oil passage 100.

Although especially not shown, the oil passage is constructed such that the 2-3 shift valve 96 described above controls the release of the second brake B2, i.e., such a frictional engagement element other than the fourth brake B4, as to be released at the gear stage at which that forth brake B4 is to be applied.

As shown in FIG. 5, the timings of feeding and draining the oil pressure to and from the fourth brake B4 can be electrically controlled. In the control system according to the present invention, therefore, the release timing of the fourth brake B4 is controlled to eliminate the shocks when the range is manually shifted from the R-range or the running range to the N-range or P-range or the non-running range. This operation is specifically shown in the flow chart of FIG. 1.

After the input signal processing (at Step 1) including the initialization of the timer and the flags, it is decided (at Step 2) whether or not the shift is made from the R-range to the N-range or the P-range. The decision of this Step 2 corresponds to shift detecting means of the present invention and can be made on the basis of the output signal of the shift position sensor which is mounted on the (not-shown) shift device.

When the answer of Step 2 is NO, the routine is returned without any control. When the answer of Step 2 is YES, on the other hand, it is decided (at Step 3) whether or not the R-range is actually achieved. This decision can be made on the basis of the period of duration of the R-range, for example, such that the answer is YES when the duration period of the R-range is longer than a predetermined value.

When the R-range is actually set so that the answer of Step 3 is YES, the switching timing T1 of the first shift solenoid valve S1 is calculated (at Step 4). In the R-range, as described hereinbefore, the second clutch C2 and the fourth brake B4 in the main transmission unit 22 are applied, and the brake B0 in the auxiliary transmission unit 21 is applied by the oil pressure which is fed through a 4-5 shift valve, although not especially shown. In the non-running range, i.e, the N-range or the P-range, moreover, all the range pressures are drained. As a result, the oil passage 70 for the R-range pressure PRev is also connected with the drain port so that its oil pressure is drained. In this case, the second clutch C2 is connected with the accumulator 92 so that its oil pressure lowers according to the characteristics of the accumulator 92 and the back pressure, i.e., the signal pressure PSLN of the linear solenoid valve SLN but is not instantly released. In other words, the timing for releasing the second clutch C2 is controlled by controlling the duty ratio of the linear solenoid valve SLN. Thus, in order that the fourth brake B4 is released according to the lowering situation of the oil pressure of the second clutch C2, the switching timing T1 of the first shift solenoid valve S1 is calculated.

This switching timing period T1 is determined according to the lowering situation of the oil pressure of the second clutch C2, as described above. Moreover, the rate to lower the oil pressure of the second clutch C2 is made the lower for the lower oil temperature and the higher for the higher engine RPM (i.e., the input RPM to the automatic transmission At) so that the period to be adopted can be corrected on the basis of those conditions or the running state of the vehicle. Incidentally, when the RPM of the second clutch C2 can be directly detected, for example, the control can be made on the basis of the RPM in place of the timer.

In order to achieve the N-range or the P-range, the first shift solenoid valve S1 is turned ON whereas the second shift solenoid valve S2 is turned OFF (at Step 5). In other words, the 1-2shift valve 79 is set to the state in which the output port 81 and the input port 80 communicate with each other. On the other hand, the 2-3 shift valve 96 is set to the state in which the input port 97 and the output port 98 are closed. As a result, the fourth brake B4 is connected by the oil passage 70 with the drain port through the 1-2shift valve 79 and the check valve 71 and through the orifice 74 so that the fourth brake B4 is slowly drained.

This control is continued for the time period T1 calculated at Step 4, that is, till the answer of Step 6 is YES. At the instant when the time period T1 determined at Step 4 elapses, the first shift solenoid valve S1 is turned OFF (at Step 7). As a result, the 2-3 shift valve 96 has communication between its output port 98 and input port 97 so that the fourth brake B4 is drained from the oil passages 99 and 70 through the 1-2shift valve 79 and the 2-3 shift valve 96 and is brought into the released state as its oil pressure abruptly lowers. At this instant, the oil pressure of the second clutch C2 is sufficiently lowered or released. Since the time period T1 is determined according to the lowering situation of the oil pressure of the second clutch C2, the oil pressure of the fourth brake B4 is lowered on the basis of the lowering situation of the oil pressure of the second clutch C2. Incidentally, the operations of the foregoing Steps 4 to 7 correspond to release control means of the present invention.

Figure 1:
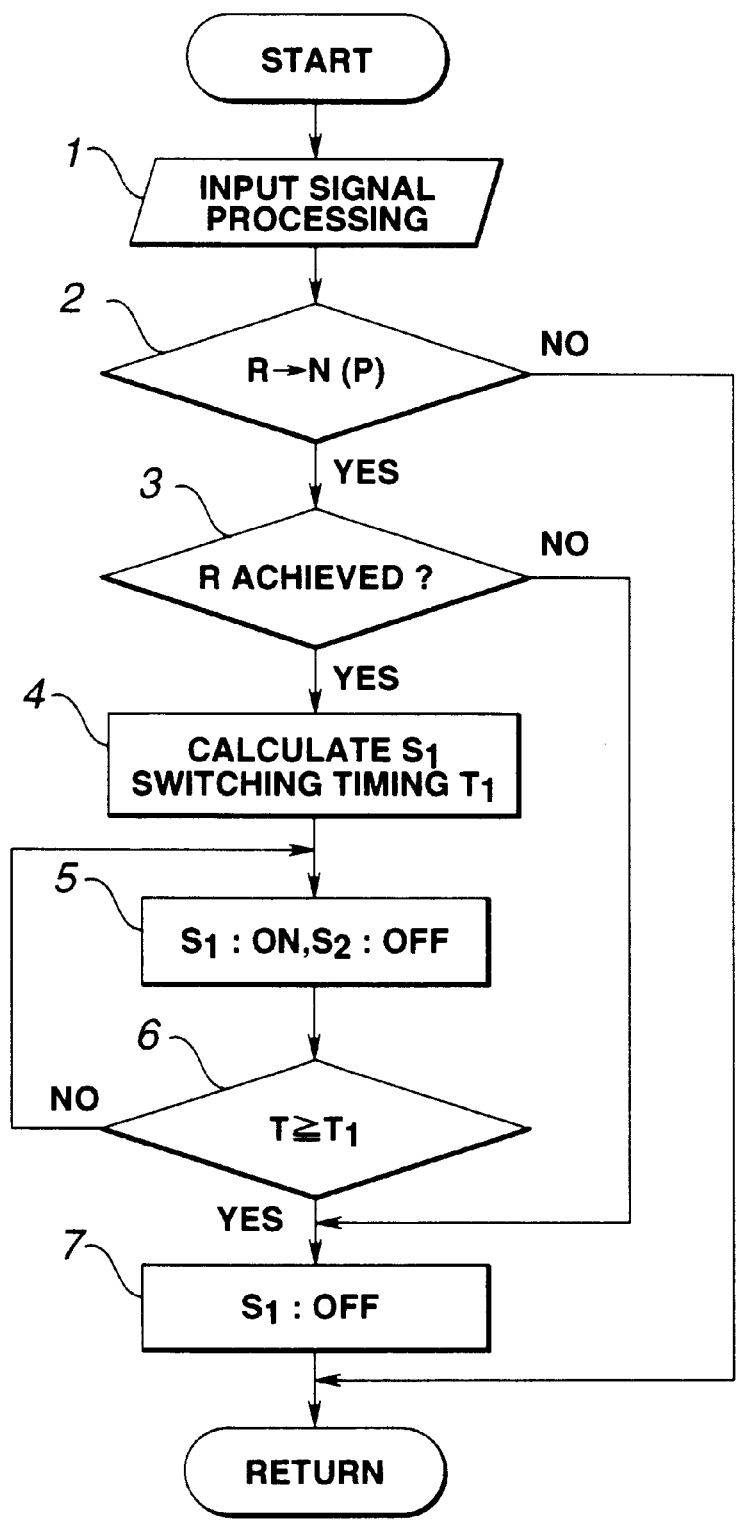
FIG. 1 is a flow chart for explaining an example of the control to be executed by a control system of the present invention.

According to the control shown in FIG. 1, therefore, both the oil pressures of the second clutch C2 and the fourth brake B4, as having set the reverse stage, slowly lower, but one of them loses the torque capacity abruptly, so that the torque of the output shaft 65 slowly lowers. As a result, at the time of the shift to the non-running range such as the N-range or the P-range, the output torque does not abruptly drop so that the shift shocks are effectively prevented.

Here will be described another example of the hydraulic circuit capable of avoiding the shocks by controlling the timings for releasing the frictional engagement elements at the time of the shift to the non-running range such as the N-range or the P-range. In the example shown in FIG. 6, a reverse control valve is used in addition to the individual valves shown in FIG. 5.

Figure 6:
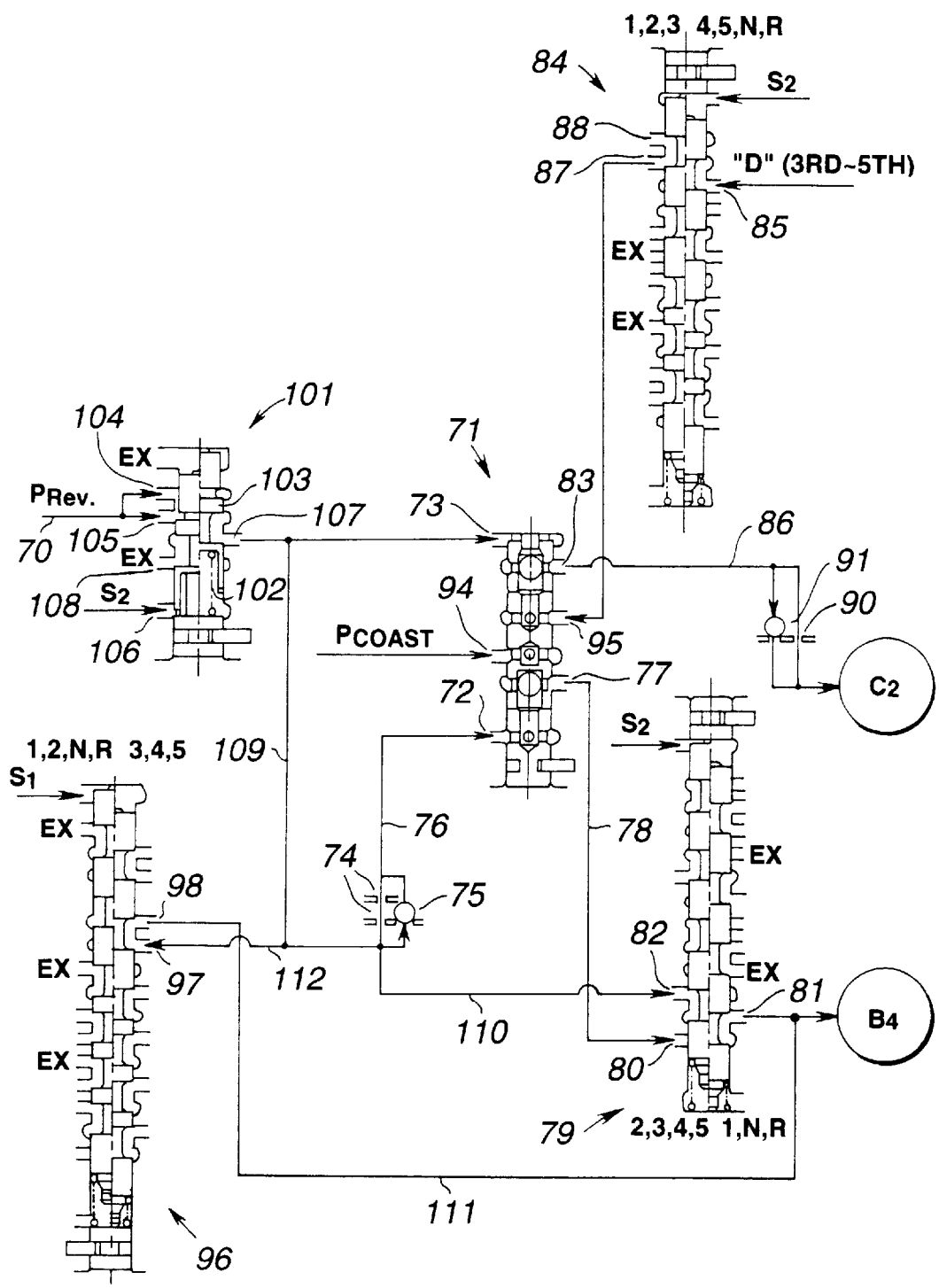
FIG. 6 is a diagram of another portion of a hydraulic circuit for controlling the applications/releases of the second clutch and the fourth clutch to be released in a neutral range.

As shown in FIG. 6, a reverse control valve 101 is a valve for selecting the R-range pressure PRev to be outputted when the R-range is selected. On a spool 103, as urged upward of FIG. 6 by a spring 102, there are formed a first land and a second land having a larger diameter, sequentially downward in the recited order. The oil passage 70 is connected with both a pilot port opened to the outer circumference of the diametrically smaller first land and an input port 105 formed below the former, as shown in FIG. 6.

In the portion where the spring 102 is arranged, on the other hand, there is opened a signal pressure port 106, which is fed with the output pressure of the second shift solenoid valve S2. An output port 107 and a drain port 108 are formed in the axially intermediate portion. As a result, the output port 107 communicates with the drain port 108 when the spool 103 is positioned, as indicated at the lefthand half of FIG. 6. When the spool 103 is positioned at the righthand half of FIG. 6, on the other hand, the input port 105 communicates with the output port 107.

This output port 107 of the reverse control valve 101 is connected via an oil passage 109 with the orifice 74 and the check ball orifice 75, as arranged in parallel with each other. These orifices 74 and 75 are connected via the oil passage 76 with the first input port 72 of the check valve 71. This check valve 71 is given a construction similar to that shown in FIG. 5 so that the oil pressure, as inputted from either the first input port 72 or the third input port 94, is outputted from the first output 77.

This first output port 77 is connected via the oil passage 78 with the input port 80 of the 1-2shift valve 79. This 1-2shift valve 79 is constructed to connect the input port 80 selectively with the output port 81 by the vertical movement, as shown in FIG. 6, of the spool on the basis of the signal pressure of the second shift solenoid valve S2. The brake B4 is connected with that output port 81.

With the drain port 82 which is formed in the 1-2shift valve 79 at the opposite side of the input port 80 across the output port 81, on the other hand, there is connected the output port 107 of the aforementioned reverse control valve 101 via the oil passage 109 and an oil passage 110.

Incidentally, the fourth brake B4 is connected via an oil passage 111 with the output port 98 of the 2-3 shift valve 96, and the input port 97, as selectively made to communicate with the output port 98, is connected with the output port 107 of the reverse control valve 101 via an oil passage 112 and the oil passage 109.

Moreover, the output port 107 of the reverse control valve 101 is connected with the second input port 73 of the check valve 71, and the second clutch C2 is connected via the oil passage 86 with the output port 83 which is selectively connected with the second input port 73. In this oil passage 86, there are disposed in parallel the orifice 90 and the check ball orifice 91. Moreover, the output port 87 of the 3-4 shift valve 84 is connected with the fourth input port 95 which is selectively given the communication with the second output port 83 of the check valve 71.

This 3-4 shift valve 84 is activated to execute the speed change between the fourth speed and the third speed on the basis of the signal pressure of the second shift solenoid valve S2, and is fed at its input port 85 with the range pressure at the third to fifth speeds. In this 3-4 shift valve 84, the input port 85 communicates with the output port 87, when the signal pressure of the second shift solenoid valve S2 is fed. When the second shift solenoid valve S2 does not output the signal pressure, on the other hand, the output port 87 communicates with the drain port 88.

When the R-range is selected with the hydraulic circuit shown in FIG. 6, the second shift solenoid valve S2 is turned OFF to output the signal pressure, and the R-range pressure PRev is fed to the pilot port 104 and the input port 105 of the reverse control valve 101. As a result, the reverse control valve 101 is given the communication between the input port 105 and the output port 107 by the upward movement, as shown in FIG. 6, of the spool 103 so that the oil pressure is fed to the first input 72 of the check valve 71 via the oil passage 109, through the orifices 74 and 75 and via the oil passage 76. In the 1-2shift valve 79, on the other hand, the input port 80 and the output port 81 are made to communicate with each other by the signal pressure outputted from the second shift solenoid valve S2, so that the R-range pressure PRev is fed from the output port 77 of the check valve 71 to apply the fourth brake B4.

If the initial pressure of the second shift solenoid valve S2 temporarily drops in the case of the control for the second shift solenoid valve S2 to output the signal pressure, the initial pressure for the signal pressure may be short to fail to switch the 1-2shift valve 79 to the state, as shown at the righthand half of FIG. 6. However, the drain port 82 is fed with the R-range pressure PRev via the oil passage 110 so that the oil pressure is fed through the drain port 82 and the output port 81 to apply the fourth brake B4. In short, the fourth brake B4 can be reliably applied even with a temporary drop in the initial pressure.

Incidentally, the second clutch C2 is also applied because it is fed with the oil pressure through the second input port 73 and the second output port 83 of the check valve 71 and via the oil passage 86.

When the shift is made from this R-range to the non-running range such as the N-range or the P-range, the not-shown manual valve is switched to cause the oil passage 70 to communicate with the drain portion. As a result, the oil pressure is discharged in the backward direction of the aforementioned route from the second clutch C2. On the other hand, the fourth brake B4 is drained via the oil passage 78 because the 1-2shift valve 79 is in the R-range to provide the communication between the output port 81 and the input port 80. The oil passage 78 communicates through the check valve 71 with the oil passage 76 and the orifice 74 so that the draining rate is lowered by the orifice 74. As a result, the releasing rate of the fourth brake B4 is made lower than that of the second clutch C2 so that the output torque in the R-range is slowly lowered.

After lapse of a predetermined time period from the start of drainage from the individual frictional engagement elements, the second shift solenoid valve S2 is turned ON. This stops the output of the signal pressure of the second shift solenoid valve S2. This control can be executed, for example, by replacing the Step 7 shown in FIG. 1 by a step of turning ON the second shift solenoid valve S2.

By this control, the 1-2shift valve 79 is switched to cause the output port 81 to communicate with the drain port 82 so that the fourth brake B4 is drained at a higher rate via the oil passage 110 and the oil passage 109. At this instant, the oil pressure in the second clutch C2 has already dropped to a satisfactory extent so that the output torque is not abruptly changed even if the fourth brake B4 is quickly released. In other words, it is possible to reliably prevent the shocks (i.e., the so-called "garage shift shocks"), as might otherwise follow the shift to the non-running range. In the neutral range, after the release of the fourth brake B4, the second shift solenoid valve S2 is turned OFF again.

Incidentally, the viscosity of the oil in the automatic transmission changes with the oil temperature. In the aforementioned hydraulic circuit shown in FIG. 6, on the other hand, the pressure from the fourth brake B4 is not discharged through neither the 1-2shift valve 79 and the reverse control valve 101. When the oil is at such a low temperature as to have a high viscosity, therefore, the fluid resistance of the pressure discharge line of the fourth brake B4 becomes relatively high. At a shift from the R-range to the N-range or P-range, therefore, the discharge rate of the pressure from the fourth brake B4 may be lowered to delay the release of the fourth brake B4. This disadvantage is solved by an example having a construction to be described in the following.

Figure 7:
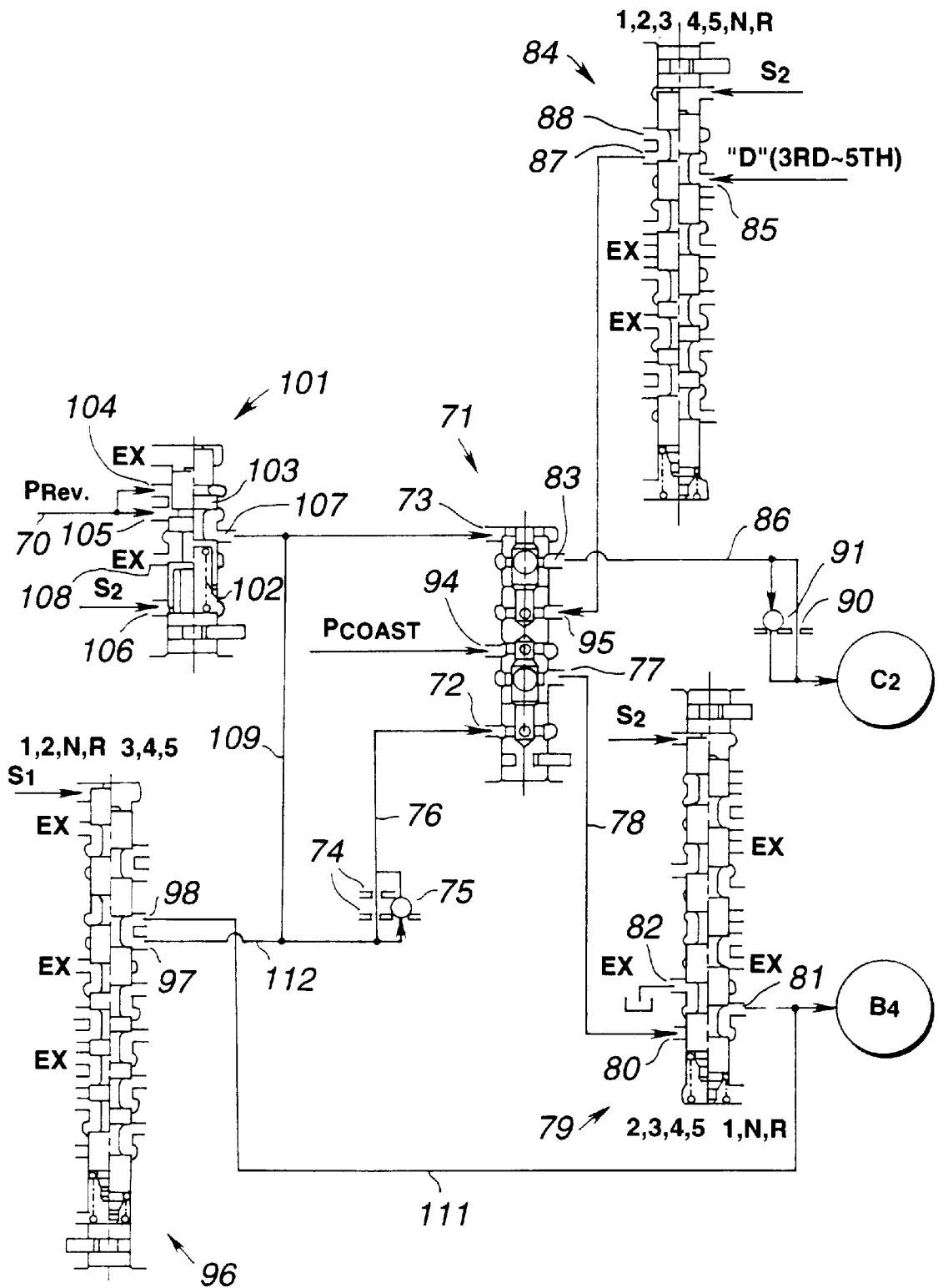
FIG. 7 is a diagram showing still another portion of a hydraulic circuit for controlling the applications/releases of the second clutch and the fourth clutch to be released in the neutral range.

Specifically, the hydraulic circuit shown in FIG. 7 is modified from that shown in FIG. 6 such that the drain port 82 of the 1-2shift valve 79 is not connected via the oil passage 109 with the reverse control valve 101 but is released to the drain. Since the remaining construction of FIG. 7 is identical to that of FIG. 6, and the same reference numerals as those of FIG. 6 are employed in FIG. 7, and their description is omitted.

Figure 8:
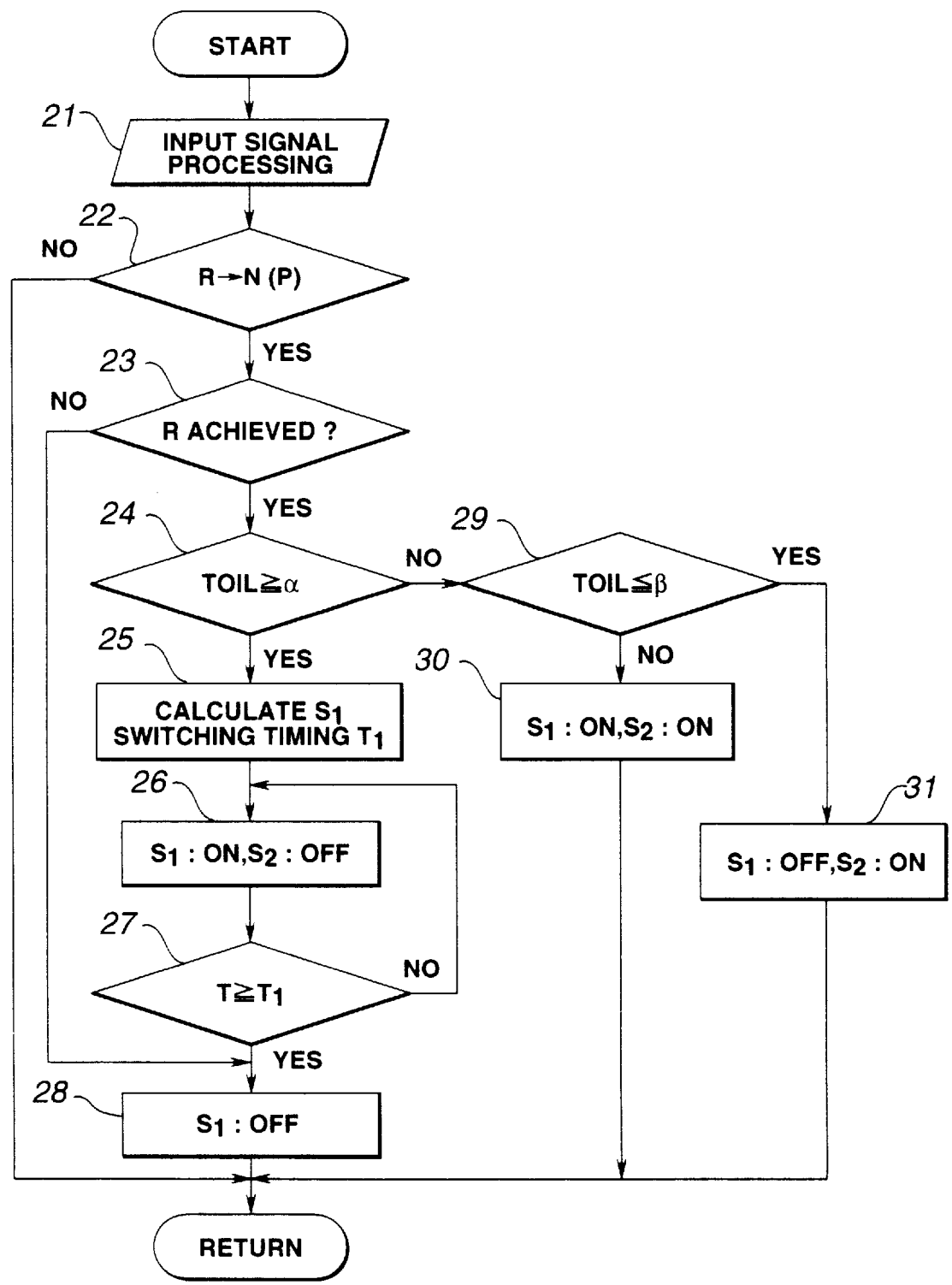
FIG. 8 is a flow chart for explaining an example of the release control of the fourth brake by using the hydraulic circuit shown in FIG. 7.

In the automatic transmission provided with the hydraulic circuit shown in FIG. 7, at the manual shift from the R-range to the non-running range, the content of the control of the pressure discharge from the fourth brake B4 is changed according to the oil temperature, as exemplified in FIG. 8. First of all, the following operations are executed in the recited order: the input signal processing (at Step S21); the decision (at Step S22) of the shift from the R-range to the N-range or the P-range; and the decision (at Step 23) of the achievement of the R-range or the reverse stage. Here: the input signal processing is similar to that of Step 1 of FIG. 1; the decision of Step S22 is similar to that of Step 2 of FIG. 1; and the decision of Step S23 is similar to that of Step 3 of FIG. 1.

If the answer of Step S23 is YES because the R-range has been achieved, it is decided (at Step S24) whether or not the oil temperature Toil exceeds a predetermined reference level α. This reference temperature α is at about the level of the room temperature. If the answer of Step S24 is YES because the oil temperature Toil exceeds the reference level α, it means that the oil viscosity is within the so-called "working range". In this case, there arises no trouble even if the controls of the hydraulic circuit shown in FIG. 6 are executed. Thus, the following operations are executed in the recited order: the calculation (at Step S25) of the switching timing T1 of the first shift solenoid valve S1; the ON control of the first shift solenoid valve S1 and the OFF control of the second shift solenoid valve S2 (at Step S26); the decision (at Step S27) that the duration time T of the control of Step S26 exceeds that T1 calculated at Step S25; and the OFF control (at Step S28) of the first shift solenoid valve S1. Incidentally, these controls of Step S25 to Step S28 are similar to those of Step 4 to Step 7 shown in FIG. 1.

If the oil temperature Toil is higher than the working range, the 1-2shift valve 79 is at first brought into the position, as indicated at the righthand half of FIG. 7, in accordance with the shift from the R-range to the non-running range. As a result, the output port 81 is opened to the input port 80 so that the pressure is discharged from the fourth brake B4 in the course of the output port 81 of the 1-2 shift valve 79→the input port 80 of the same→the oil passage 78→the first output port 77 of the check valve 71→the first input port 72 of the same→the orifice 74→the oil passage 109→the output port 107 of the reverse control valve 101→and the drain port of the same. In this case, therefore, the passage is throttled by the orifice 74 so that the oil is slowly drained from the fourth brake B4. In other words, the fourth brake B4 is released according to the release of the second clutch C2.

When the time period T1 calculated at Step S25 elapses, the first shift solenoid valve S1 is turned OFF to provide the communication between the output port 98 and the input port 97 of the 2-3 shift valve 96. As a result, the pressure of the fourth brake B4 is discharged not only via the aforementioned oil pressure line through the orifice 74 but also via the oil pressure line through the 2-3 shift valve 96, the oil passages 112 and 109 and the reverse control valve 101. In other words, the oil pressure is quickly discharged via the oil passage 111→the output port 98 of the 2-3 shift valve 96→the input port 97 of the same→the oil passage 112→the oil passage 109→the output port 107 of the reverse control valve 101→the drain port 108 of the same. At this instance, the second clutch C2 is substantially completely released to raise no shock. If the answer of Step S22 is NO, this routine is passed through. If the answer of Step S23 is NO, the routine advances to Step S28.

Incidentally, for the control of this Step S28, the first shift solenoid valve S1 is not turned OFF, but the second shift solenoid valve S2 may be turned ON. Then, no signal pressure is fed to the 1-2shift valve 79 when the second clutch C2 is substantially completely released. As a result, the output port 81 of the 1-2shift valve 79 is opened to the drain port 82 so that the pressure is quickly discharged from the fourth brake B4 through those ports 81 and 82. Thus, at the shift to the non-running range, the fourth brake B4 can be released without any shock.

If, on the other hand, the answer of Step 24 is NO because the oil temperature Toil is lower than the aforementioned reference level α, it is decided (at Step S29) whether or not the oil temperature Toil is lower than the other reference level β (<α).This other reference temperature β is at a level of the ambient temperature in winter a t the extremely cold area. Therefore, if the answer of Step S29 is YES, the oil temperature Toil is extremely low so that the oil viscosity is extremely high. If the answer is NO, the oil temperature Toil is considerably low so that the oil viscosity is higher than the working range. Hence, the operations of Step S24 and Step S29 can be said to correspond to oil temperature detecting means or viscosity deciding means. Thus, if the answer of Step S29 is NO, that is, if the oil viscosity is considerably high, both the first and second shift solenoid valves S1 and S2 are turned ON (at Step 30). As a result, the 1-2shift valve 79 takes the state, as indicated at the lefthand side of FIG. 7, to provide the communication between the output port 81 and the drain port 82, through which the pressure is discharged from the fourth brake B4. In this case, the oil temperature Toil is so low that the oil viscosity is considerably high, but the piping line for discharging the pressure from the fourth brake B4 has only the 1-2shift valve 79 and has a low fluid resistance so that the delay of the pressure discharge from the fourth brake B4 is prevented or suppressed.

If the answer of Step S29 is YES because the oil temperature is extremely low, the routine advances to Step S31 to turn OFF the first shift solenoid valve S1 and ON the second shift solenoid valve S2. In the 1-2shift valve 79, therefore, the output port 81 communicates with the drain port 82 so that the pressure is discharged from the fourth brake B4 through those ports 81 and 82.

On the other hand, the 2-3 shift valve 96 comes into the state, as indicated at the righthand half of FIG. 7, so that its output port 98 and input port 97 communicate with each other. As a result, the oil pressure from the fourth brake B4 is discharged via the oil passage 111→the output port 98 of the 2-3 shift valve 96→the input port 97 of the same→the oil passages 112 and 109→the output port 107 of the reverse control valve 101→the drain port 108 of the same. In other words, the oil pressure from the fourth brake B4 is drained via the two routes. Even if, therefore, the oil temperature Toil is so low that the oil viscosity rises, the resistance of the entirety of the pressure discharging line is lowered to cause no delay in the pressure discharge from the fourth brake B4. In the example shown in FIGS. 7 and 8, the operations of Steps S26, S30 and S31 correspond to means for selecting the pressure discharging line of the present invention.

With the control shown in FIG. 8 being thus executed by using the hydraulic circuit shown in FIG. 7, the resistance of the piping line for discharging the pressure from the frictional engagement element to be released at the shift to the non-running range changes to high and low levels in accordance with the temperature or viscosity of the oil. This prevents the oil pressure discharge of the frictional engagement element from being delayed or excessively quickened. As a result, the change in the output torque, as accompanying the shift to the non-running range, can be smoothed to prevent the shock.

Incidentally, the foregoing specific embodiment has been described in case the present invention is applied to the control system for the automatic transmission having the gear train shown in FIG. 3. Despite of this description, the present invention can also be applied to a control system for an automatic transmission equipped with a gear train other than that shown in FIG. 3. Therefore, the frictional engagement elements to be released according to the shift to the non-running range are not limited to the second clutch and the fourth brake. In the present invention, moreover, the means for controlling the timing for releasing the frictional engagement elements are not limited to the aforementioned 1-2shift valve and 2-3 shift valve.

Here will be synthetically described the advantages to be attained by the present invention. For releasing the first frictional engagement element and the second frictional engagement element to switch the running range to the non-running range, according to the present invention, the drop in the oil pressure of the second frictional engagement element is controlled according to the lowering situation of the oil pressure of the first frictional engagement element. As a result, either of the frictional engagement elements is not released earlier by itself, but the torque capacities of the two frictional engagement elements are gradually lowered to make gentle the change in the output torque of the automatic transmission. Thus, it is possible to prevent the shocks which might otherwise follow the shift to the non-running range.

In the present invention, moreover, the timed releasing control of the frictional engagement elements to be released according to the shift to the non-running range is executed by the two shift valves which are provided for executing the speed changes. Thanks to this construction, the control to release the frictional engagement elements at the shift to the non-running range can be executed by using the existing system so that the system can be simplified.

What is claimed is:

1. A control system for an automatic transmission, in which a first frictional engagement element and a second frictional engagement element are released according to a shift from a running range to a non-running range, comprising:

shift detecting means for detecting the shift from the running range to the non-running range; and release control means for controlling a reduction in the oil pressure of said second frictional engagement element on a basis of the reduction in the oil pressure of the first frictional engagement element when the shift from the running range to the non-running range is detected by said shift detecting means.

2. A control system according to claim 1, wherein said release control means includes means for lowering the oil pressure of said second frictional engagement element after the reduction in the oil pressure of the first frictional engagement element begins.

3. A control system according to claim 1, further comprising:

a first oil pressure line for providing the communication of said second frictional engagement element with a drain portion through an orifice when in said non-running range; and a second oil pressure line for providing the communication of said second frictional engagement element with the drain portion while bypassing said orifice, wherein said release control means includes means for providing the communication of said second frictional engagement element with the drain portion by opening said second oil pressure line on the basis of the reduction in the oil pressure of said first frictional engagement element.

4. A control system according to claim 1, further comprising:

means for deciding the reduction state of the oil pressure of said first frictional engagement element on the basis of an RPM of said first frictional engagement element, wherein said release control means includes means for executing a control to reduce the oil pressure of said second frictional engagement element at the instant when said RPM takes a predetermined value.

5. A control system according to claim 1, wherein said release control means includes means for draining the oil pressure of the second frictional engagement element entirely after the oil pressure of the first frictional engagement element is reduced sufficiently when the shift from the running range to the non-running range is detected by said shift detecting means.

6. A control system according to claim 1, further comprising:

a first oil pressure line including a first shift valve for providing the communication of said second frictional engagement element with a drain portion in said non-running range; and a second oil pressure line arranged in parallel with said first oil pressure line and including a second shift valve, wherein said release control means includes means for changing switching timings of said shift valves.

7. A control system according to claim 6, further comprising:

a first shift solenoid valve for outputting a signal pressure to switch said first shift valve; and a second shift solenoid valve for outputting a signal pressure to switch said second shift valve, wherein said release control means includes means for controlling switching timings of said shift solenoid valves.

8. A control system according to claim 6, further comprising:

an orifice formed in said second oil pressure line in series with said second shift valve, wherein said release control means includes means for providing the communication of said second frictional engagement element with the drain portion by switching said first shift valve when the oil pressure of said first frictional engagement element reduces.

9. A control system according to claim 1, further comprising:

an oil passage in which an oil pressure is built up in said running range and drained in said non-running range;

a first oil pressure line connected with said oil passage and having an orifice therein;

a second oil pressure line connecting with said oil passage but having no orifice; and a valve for switching the communication of said second frictional engagement element with said first oil pressure line and said second oil pressure line, wherein said release control means includes means for switching said valve to provide the communication of said second frictional engagement element with said second oil pressure line in said non-running range and on the basis of the reduction in the oil pressure of said first frictional engagement element.

10. A control system according to claim 9, wherein said valve is activated in both said running range and said non-running range by a signal pressure outputted from a solenoid valve, to provide the communication of said first oil pressure line with said second fictional engagement element.

11. A control system according to claim 10, wherein said valve includes means for providing the communication of said second oil pressure line with said second frictional engagement element when said signal pressure is low.

12. A control system according to claim 9, further comprising:

change-over valve activated by a signal pressure outputted from a solenoid valve to provide the communication of said oil passage with said first oil pressure line and said second oil pressure line.

13. A control system according to claim 1, further comprising:

means for deciding the reduction state of the oil pressure of said first frictional engagement element in terms of a time lapse by a timer, wherein said release control means includes means for executing a control to reduce the oil pressure of said second frictional engagement element at the time lapse.

14. A control system according to claim 13, further comprising:

means for setting said time lapse on the basis of an oil temperature and/or an input RPM.

15. A control system of an automatic transmission in which a frictional engagement element to be released according to a shift from a running range to a non-running range is connected with a plurality of pressure discharging lines of different fluid resistances, comprising:

shift detecting means for detecting the shift from the running range to the non-running range;

oil temperature detecting means for detecting the temperature of a fluid to actuate said frictional engagement element; and pressure discharging line selecting means for selecting the line to discharge the pressure therethrough from said frictional engagement element, on the basis of the temperature which is detected by said oil temperature detecting means, wherein said pressure discharging lines include a line for causing said frictional engagement element to communicate with a drain portion through a first shift valve; a line for causing said frictional engagement element to communicate with the drain portion via an oil passage having a second shift valve and an orifice; and a line for causing said frictional engagement element to communicate with a drain portion through said second shift valve, and wherein said pressure discharging line selecting means includes a first shift solenoid valve for outputting a signal pressure to switch said first shift valve; and a second shift solenoid valve for outputting a signal pressure to switch said second shift valve.

16. A control system according to claim 15, wherein said pressure discharging line selecting means includes means for selecting a pressure discharging line of a low conduit resistance as the line for discharging the pressure from said frictional engagement element, when the oil temperature detected by said oil temperature detecting means is low.

17. A control system for an automatic transmission in which a frictional engagement element to be released according to a shift from a running range to a non-running range is connected with a plurality of pressure discharging lines of different fluid resistances, comprising:

shift detecting means for detecting the shift from the running range to the non-running range;

oil temperature detecting means for detecting the temperature of a fluid to actuate said frictional engagement element;

pressure discharging line selecting means for selecting the line to discharge the pressure therethrough from said frictional engagement element, on the basis of the temperature which is detected by said oil temperature detecting means; and another frictional engagement element to be released at a switching time from the running range to the non-running range, wherein said pressure discharging line selecting means includes means for discharging the pressure from said frictional engagement element through any of said pressure discharging lines at a predetermined time lapse after said another frictional engagement element begins to be released according to the switching to the non-running range.

* * * * *